Feb. 24, 1959 H. A. WAGNER 2,874,793
POWER STEERING MEANS FOR WHEELED VEHICLES
Filed Oct. 28, 1957

INVENTOR.
HAROLD A. WAGNER
BY
BUCKHORN, CHEATHAM & BLORE

ATTORNEYS

United States Patent Office 2,874,793
Patented Feb. 24, 1959

2,874,793
POWER STEERING MEANS FOR WHEELED VEHICLES

Harold A. Wagner, Portland, Oreg.

Application October 28, 1957, Serial No. 692,786

4 Claims. (Cl. 180—79.2)

My present invention comprises power steering means for wheeled vehicles. A principal object of the present invention is to provide power steering means in which a feeling of the road is transmitted back to the operator of the vehicle so as to give the operator a sure sense of the response of the vehicle to steering movements.

A further object of the present invention is to provide power steering means for wheeled vehicles in which over-controlling is rendered almost impossible, since conscious effort must be applied to a steering member grasped by the operator in order to cause the steerable wheel means to continue turning from a previous position. While sharp turns may be made, it is necessary to exert force on the steering member as long as the steerable wheels are continuing to deviate from their previous positions. Thus, it is practically impossible for accidents caused by rapid turning of the manual steering member to occur.

A further object of the present invention is to provide means of the foregoing character in which hydraulic motive means are incorporated, resulting in a very simple, inexpensive and easily fabricated power steering mechanism.

A further object of the present invention is to provide power steering mechanism which will hold a set course, there being a reverisble valve controlling the power steering motor, which in its neutral position locks the steering motor against turning movement.

A further object of the present invention is to provide means of the foregoing character in which the power steering mechanism may be easily disengaged to release the steerable wheel means in order that the vehicle may be towed.

The foregoing and other objects and advantages of the present invention will be apparent from inspection of the accompanying drawings taken in connection with the following specification wherein like parts refer to like numerals throughout and in which a preferred form of the invention is described and illustrated.

Figure 1:
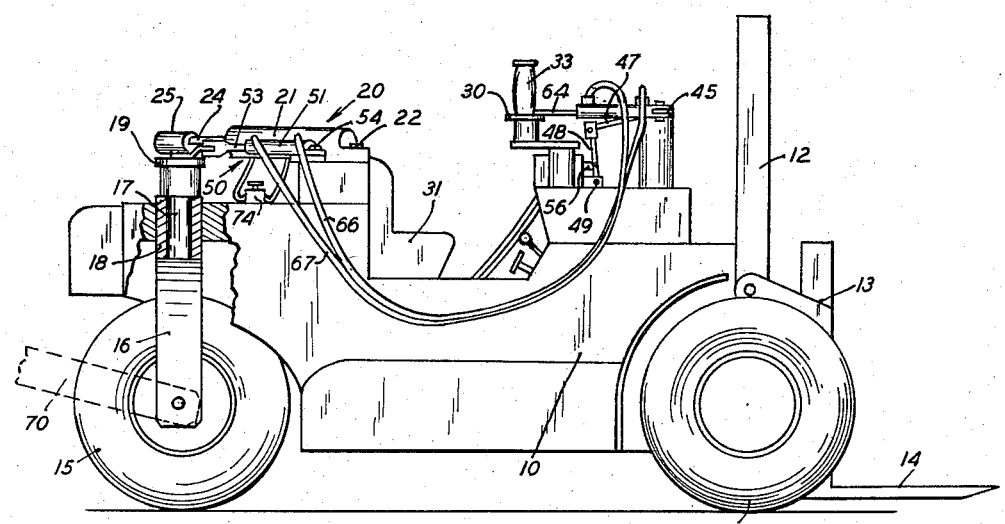
Fig. 1 is a view in side elevation, partially broken away, of a wheeled vehicle having the present invention incorporated therein.
Figure 2:
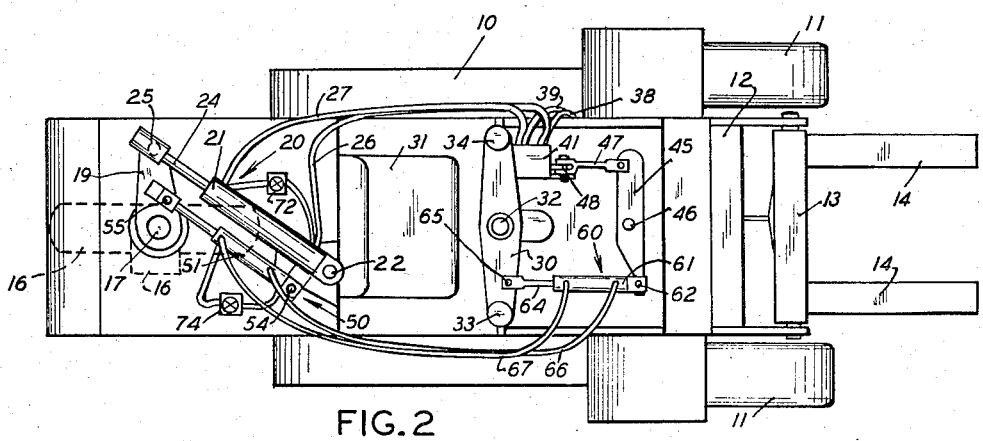
Fig. 2 is a plan view of Fig. 1.

The automotive vehicle illustrated in the drawings comprises a chassis 10 having two forward power wheels 11 connected to an engine (not shown) in the chassis whereby the vehicle is propelled in the conventional manner. The vehicle comprises a work handling device including an upright tower 12 at the front of the vehicle upon which a carriage 13 may ascend and descend, the carriage being provided with a work handling device 14 upon which materials may be moved about and elevated or lowered through suitable control means actuated by the operator (not shown). The particular vehicle is a tricycle vehicle having a single, rear steerable wheel 15 mounted upon a wheel clevis 16 depending from a tiller shaft 17 journalled in an upright journal 18 at the rear of the chassis. The upper end of the tiller shaft is connected to a transversely extending tiller bar 19 through which turning movement of the wheel 15 is accomplished by the power steering motor 20 of the present invention. It is to be appreciated that any form of wheeled vehicle could have the present invention incorporated therein, it merely being required that controllable means be connected to the steerable wheel means, said controller means including a shifting part which moves with the steerable wheel means corresponding to the tiller bar 19.

The tiller bar is pivotally moved by the power steering motor 20 connected thereto, the present embodiment of the invention comprising a piston and cylinder device including a cylinder 21 pivotally connected at 22 to a portion of the chassis, and a piston 23 within the cylinder 21 and fixed to a rearwardly projecting piston rod 24 which is pivotally connected to the tiller bar 19 at 25. The power steering motor is a reversible motor having a fluid conduit 26 connected to one end of the cylinder 21 and a conduit 27 connected to the other end of the cylinder 21. The piston 23 is located midway of the cylinder 21 when the tiller bar is so positioned as to set the steerable wheel 15 for a straightaway course. The piston 23 is moved toward either end of the cylinder by admitting fluid under pressure through one of the conduits and permitting escape of fluid from the other end of the cylinder through the other of the conduits. The piston and cylinder device 21–24 extends diagonally of the vehicle merely in order to place a longer, more powerful motor in a limited space, the diagonal positioning being of no significance.

A steering member 30, preferably in the form of a transverse bar, is positioned forwardly of a driver's seat 31 where it is accessible to the operator of the vehicle. The steering member 30 is pivotally mounted at 32 so as to rotate in a horizontal plane. The steering member is provided with a pair of knobs 33 and 34 at its opposite ends, each of which is of a size conveniently to be grasped in one hand of the operator. Steering movement is effected by pushing forward on one knob and pulling rearwardly on the other, the bar being angularly displaced in a clockwise direction in order to effect turning movement toward the right, and counterclockwise in order to effect turning movement to the left. It can be seen that because of the rearward position of the steerable wheel 15 the tiller bar 19 is angularly displaced in the opposite direction, counterclockwise to effect turning movement of the vehicle toward the right and clockwise to effect turning movement of the vehicle toward the left.

Fluid under pressure is supplied from a source of pressure fluid, conveniently comprising a pump 36 connected to the automotive engine in any suitable manner (not shown), continuously drawing hydraulic fluid from a storage tank 37 mounted on the chassis. The pump continuously discharges through an outlet conduit 38 and fluid is returned to the supply tank continuously through an inlet conduit 39. A pressure relief valve 40 is provided between conduits 38 and 39 so that the pump merely circulates fluid from and into the supply tank unless called upon to energize the power steering motor.

The conduits 38 and 39 are preferably in the form of flexible hoses connected to the ports of a reversible control device comprising a valve 41 which is operatively connected to the steering member 30. The valve 41 is reversible and has a neutral position blocking fluid flow therethrough. When the valve is opened from neutral in one direction fluid will be forced through conduit 26 into one end of the double-acting, piston-and-cylinder, power steering motor 20, movement of the piston 23 forcing fluid back through the conduit 27 into the supply tank. Opening of the control valve 41 in the opposite direction reverses the flow, fluid being supplied under pressure through conduit 27 to move the piston 23 toward the right, and fluid being returned to the supply tank through conduit 26. When the control valve 41 is in its neutral position with flow being blocked, the piston 23 is held at whatever position it may have reached.

The steering member 30 is operatively connected to the valve 41 through a valve control bar 45 pivotally mounted on the chassis at 46, the axes of the pivots 32 and 46 being parallel and displaced from each other, and the bar 45 shifting in substantially the same plane as the steering member 30. One end of the control bar 45 is pivotally connected to a linkage comprising a rearwardly extending link 47, whose rearward end is pivotally connected to a valve operating lever 48 which extends upright alongside of the valve 41. The lower end of lever 48 is pivotally connected to the chassis at 49, and a valve stem 56 is pivotally connected to an intermediate point on the lever 48 and extends into the valve, whereby the valve may be opened in either direction or returned to neutral corresponding to the movement of lever 48, link 47, and control bar 45.

A master motor-slave motor system interconnects the tiller bar 19, through the chassis 10, and the valve control means comprising the steering member 30 and the control bar 45. The system comprises a master motor 50 consisting of a cylinder 51 in which there is located a piston 52 connected to a protruding piston rod 53. One end of the cylinder 51 is pivotally mounted on the chassis at 54 and the outer end of the piston rod 53 is pivotally connected at 55 to an intermediate portion of the tiller bar 19. The master cylinder 50 lies alongside of and generally parallel to the power steering motor cylinder 21. When piston 23 is displaced toward the left as disclosed in Fig. 3, piston 52 is correspondingly displaced toward the left, and vice versa.

A slave motor device 60 is connected between the steering member 30 and the control bar 45. The slave motor comprises a cylinder 61 which is pivotally connected at 62 to an end of bar 45, and a piston 63 therein from which projects a piston rod 64 pivotally connected at 65 to the steering member 30. A closed, flexible conduit 66 connects the forward end of cylinder 51 to the forward end of cylinder 61, and a second closed flexible conduit 67 connects the rearward end of cylinder 51 to the rearward end of cylinder 61. Separate bodies of hydraulic fluid respectively fill each of the conduits 66, 67 and the cylinder spaces connected thereby. Relative displacement of piston 52 in cylinder 51 must therefore be accompanied by corresponding relative displacement of piston 63 in cylinder 61; however the arrangement is such that the action of the slave motor is the reverse of the action imparted to the master motor 50. Thus, as illustrated in Fig. 3, when the piston 52 is displaced to the left in cylinder 51 the cylinder 61 is correspondingly displaced to the left while piston 63 remains stationary.

Figure 3:
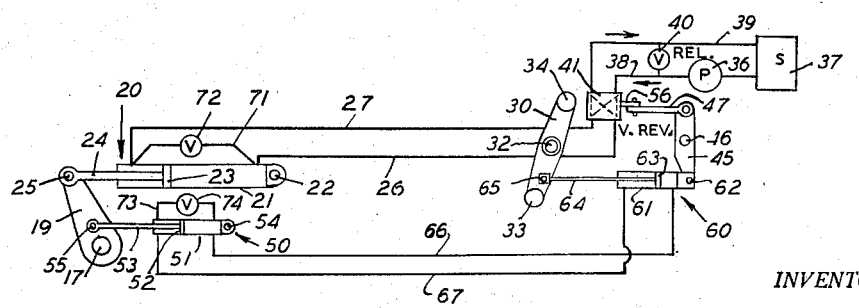
Fig. 3 is a schematic representation of the hydraulic means and other parts of the present invention.

The action of the device as illustrated in Fig. 3 is as follows: The operator has swung the steering member 30 clockwise for a period of time such that it has moved a considerable distance clockwise, to the extent of about twenty degrees, whereby the tiller bar 19 has been moved counter-clockwise to the same extent and the steerable wheel 15 has assumed a position at twenty degrees to the longitudinal axis of the vehicle in a manner to cause the vehicle to progress along a twenty degree curve to the right. At the instant of starting to move the steering member the relative positions of the slave-motor piston and cylinder were fixed, due to the bodies of fluid locked into the master motor-slave motor system. This caused the valve operator bar 45 to be displaced angularly in a counter-clockwise manner, thereby opening the valve 41 in the direction to cause fluid under pressure to flow through conduit 26 and force the piston 23 toward the left. Doing so forced piston 52 of the master motor 50 toward the left, thereby forcing fluid through conduit 67 into the left end of the slave motor cylinder 61, tending to displace the cylinder 61 rearwardly and bring the valve operator bar 45 back to a neutral position extending transversely of the vehicle. However, as long as the operator continually pushed on hand grip 34, the swinging movements of the steering member 30 and tiller bar 19 would continue, thereby continually displacing piston 52 toward the left and continually holding the valve open. When the degree of turning movement as desired by the operator was achieved, pressure was released from the steering member, causing the cylinder 61 to come to a halt when the valve control bar 45 reached a transverse position, as illustrated. This placed the reversible valve 41 in neutral, locking the power supply system against fluid flow from or to the power steering motor 20, thereby locking the master motor-slave motor system and the steering bar 30 at the positions which had been reached. The vehicle would continue on the set course until the operator again displaced the steering member 30 in either direction, either to return the vehicle toward a straightaway course or to increase the degree of curvature of its path.

Manually actuated valve means are provided to release the steerable wheel whereby the vehicle may be towed, as for example, by means of a towing fork 70 indicated in dash outline in Fig. 1 as being connected to the axle of the steerable wheel 15 at one end, the opposite end being connected to a towing vehicle (not shown). The release means comprises a by-pass conduit 71 connecting one end of the power steering motor 19 to its other end, there being a manually operable valve 72 in the conduit. Thus, it would make no difference how the valve 41 is positioned, since the fluid would merely circulate through the pressure fluid supply system without moving the piston 23. There is also provided a by-pass conduit 73 connecting one end of cylinder 51 to its opposite end, thus connecting conduit 66 to conduit 67, there being a manually operable valve 74 in the conduit. Again, it makes no difference what happens to the tiller bar 19, since displacement of the piston 52 within the piston 51 will merely cause displacement of fluid from one end of cylinder 51 to the other. The steerable wheel is thereby freed so that the vehicle may be towed, since there is nothing to resist steering movement of the wheel 15 as effected by the towing bar 70.

It is to be appreciated that it is not necessary that the power steering motor be hydraulically actuated. Other motive means could be provided to shift tiller bar 19 under control of a control device 41 which is reversible in response to movement of the control bar 45 and which would have a neutral position for locking the vehicle at a set course. Any part corresponding to the tiller bar 19 may be operatively connected to a master motor-slave motor system as described.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. Power steering mechanism for wheeled vehicles having steerable wheel means comprising a power steering motor mounted on the vehicle, means operatively connecting said power steering motor to said wheel means for effecting turning movement thereof, said power steering motor being reversible to cause turning of the wheel means in either direction and being capable of holding the wheel means at a set position when deenergized, a steering member pivotally mounted on the vehicle so as to be accessible to the operator thereof, a control device, means operatively connecting said control device to said steering member for movement responsive thereto, means connecting said control device to said power steering motor for energizing the latter in the proper direction upon movement of said steering member and deenergizing the latter upon return of said control device to a neutral position, a master piston and cylinder device pivotally connected to the vehicle at one end and pivotally connected to said means operatively connecting said power steering motor to said wheel means whereby said master piston and cylinder device is contracted upon turning movement of the wheel means in one direction and expanded upon turning movement of said wheel means in the opposite direction, a slave hydraulic piston and cylinder device pivotally connected to said steering member at one end and pivotally connected to said means connecting said control device to said steering member at its other end, a first closed conduit connecting one end of said master motor cylinder to one end of said slave motor cylinder, a second closed conduit connecting the other end of said master motor cylinder to the other end of said slave motor cylinder, and separate bodies of fluid respectively filling each of said conduits and the cylinder spaces connected thereby whereby said control device is returned to a neutral position when said steering member is released, thereby causing the vehicle to hold a set course until further manual actuation of said steering member.

2. The construction set forth in claim 1 in combination with manually controlled by-pass valve means for connecting one of said closed conduits to the other and for connecting one end of said power steering motor cylinder to its other end whereby said steerable wheel means may be released for free movement in order to permit towing of the vehicle.

3. Power steering mechanism for wheeled vehicles having steerable wheel means comprising a source of fluid under pressure, a power steering motor comprising a double acting piston and cylinder device, pressure fluid conducting means connecting said device to said source and including a reversing valve for extending or contracting said device, said valve having a neutral position for holding said device at any position by blocking fluid flow through said pressure fluid conducting means, a tiller bar pivotally mounted on the vehicle and connected to said power steering motor for movement thereby, said steerable wheel means being connected to said tiller bar whereby the path of movement of the vehicle is controlled, a steering member pivotally mounted on the vehicle so as to be accessible for steering displacement by the operator thereof, a valve control bar pivotally mounted on the vehicle on an axis parallel to the axis of said steering member and displaced therefrom, a slave motor comprising a double acting piston and cylinder device extending between and pivotally connected to said steering member and said valve control bar at its respective ends, a master motor comprising a double acting piston and cylinder device lying alongside and generally parallel to said power steering motor and having one end pivotally connected to the vehicle and its other end pivotally connected to said tiller bar, a first closed conduit connecting one end of said master motor cylinder to one end of said slave motor cylinder, a second closed conduit connecting the other end of said master motor cylinder to the other end of said slave motor cylinder, separate bodies of liquid respectively filling each of said closed conduits and the cylinder spaces respectively connected thereby, and a valve control linkage operatively connecting said valve control bar to said reversing valve.

4. The construction set forth in claim 3 in combination with manually controlled by-pass valve means for connecting one of said closed conduits to the other and for connecting one end of said power steering motor cylinder to its other end whereby said steerable wheel means may be released for free movement in order to permit towing of the vehicle.

References Cited in the file of this patent

UNITED STATES PATENTS

| | | |
|---|---|---|
| 2,252,660 | Kulikoff | Aug. 12, 1941 |
| 2,506,093 | MacDuff | May 2, 1950 |
| 2,603,065 | Sarto | July 15, 1952 |
| 2,734,589 | Groen | Feb. 14, 1956 |
| 2,797,764 | Wysong | July 2, 1957 |

FOREIGN PATENTS

| | | |
|---|---|---|
| 629,649 | France | Nov. 14, 1927 |